United States Patent
Suk

(10) Patent No.: US 6,980,532 B1
(45) Date of Patent: Dec. 27, 2005

(54) APPARATUS AND METHOD FOR COMBINING SYMBOL DATA IN CDMA COMMUNICATION SYSTEM

(75) Inventor: Won-Kyu Suk, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 09/578,610

(22) Filed: May 25, 2000

(30) Foreign Application Priority Data

May 25, 1999 (KR) .................. 10-1999-0018781

(51) Int. Cl.$^7$ ............................................. H04Q 7/00
(52) U.S. Cl. ................ 370/328; 370/342; 370/441; 375/349
(58) Field of Search ................ 370/206, 208, 370/209, 315, 317, 320, 328, 335, 342, 441, 370/479

(56) References Cited

U.S. PATENT DOCUMENTS

| | | | | |
|---|---|---|---|---|
| 6,058,138 A | * | 5/2000 | Fukumasa et al. | 375/349 |
| 6,192,066 B1 | * | 2/2001 | Asanuma | 375/130 |
| 6,304,750 B1 | * | 10/2001 | Rashid-Farrokhi et al. | 370/335 |
| 6,385,181 B1 | * | 5/2002 | Tsutsui et al. | 370/335 |
| 6,408,039 B1 | * | 6/2002 | Ito | 370/335 |
| 6,426,949 B1 | * | 7/2002 | Zhou et al. | 370/342 |

* cited by examiner

*Primary Examiner*—Chi Pham
*Assistant Examiner*—Anh-Vu H Ly
(74) *Attorney, Agent, or Firm*—Dilworth & Barrese LLP

(57) ABSTRACT

An apparatus and method for combining symbols received from multi-paths in a CDMA communication system. In the symbol combining apparatus, a plurality of fingers despread signals received in multi-paths and extract symbol data, and a symbol combiner combines symbol data except for symbol data whose signs are inverted due to fading among the symbol data received from the fingers.

7 Claims, 3 Drawing Sheets

APPARATUS AND METHOD FOR COMBINING SYMBOL DATA IN CDMA COMMUNICATION SYSTEM

PRIORITY

This application claims priority to an application entitled "Apparatus and Method for Combining Symbol Data in CDMA Communication System" filed in the Korean Industrial Property Office on May 25, 1999 and assigned Serial No. 99-18781, the contents of which are hereby incorporated by reference.

BACKGROUND OF THE INVENTION

1. Field of the Invention

The present invention relates generally to an apparatus and method for combining symbol data in a CDMA (Code Division Multiple Access) communication system, and in particular, to an apparatus and method for combining symbol data with a fading component removed.

2. Description of the Related Art

Generally, a base station in a CDMA communication system separates a transmission data signal d(t) into I and Q signals by 1:2 demultiplexing the data signal d(t) into an even-numbered data signal and an odd-numbered data signal. The I and Q signals are multiplied by a corresponding orthogonal code for orthogonal spreading and a pilot signal is added only to the I signal for complex pseudo-noise ("PN") spreading. The resulting signals pass through filters and are upconverted in frequency prior to transmission. A mobile station receiver receives the signal on a fading channel from the base station. The input signal at the receiver can be expressed as $$S_1(t) = (PW_0 + IW_d + jQW_d)(PN(I) + PN(Q)) \times (\cos(wt) + j\sin(wt))(f(I) + jf(Q)) \quad \text{Eq. 1}$$

where $(f(I)+jf(Q))$ is a fading component, P is a pilot signal, $W_0$ is a pilot channel orthogonal code, $W_d$ is a predetermined orthogonal code for orthogonal modulation and PN(I) and PN(Q) are orthogonal code for orthogonal spreading.

Therefore, the mobile station combines multi-path signals and demodulate symbol data with the highest energy to achieve the best reception. As a result, a decoder can perform accurate decoding. It has been reported that a maximum ratio combining method results in the highest performance. In the maximum ratio combining method, input symbol data is multiplied by a fading component for channel compensation and only symbol data with energies higher than a predetermined level among the channel-compensated symbol data are combined.

The problem with the maximum ratio combining method is that the fading component is entirely canceled when multiplying the symbol data by the fading component only when the phase of received symbol data is equal to the phase of the fading component. Accurate phase compensation to eliminate the fading component has not been achieved in the prior art. Therefore, symbols are combined while the fading component exists. Possible combination of symbols with a deep fading component reduces symbol energy, thereby nullifying the effect of symbol combination to obtain a maximum energy.

SUMMARY OF THE INVENTION

It is, therefore, an object of the present invention to provide an apparatus and method for combining symbol data with a fading component removed in a mobile station of a CDMA communication system.

It is another object of the present invention to provide an apparatus and method for selecting symbol data of each multi-path to combine symbol data at a maximum ratio in a mobile station of a CDMA communication system.

It is a further object of the present invention is to provide a symbol combining apparatus and method for excluding signals from paths having inverted data owing to serious fading, even though it is determined that any received data has sufficient energy for symbol combination because of a problem of a conventional method in measuring reception energy in a mobile station of a CDMA communication system.

The above and other objects can be achieved by providing an apparatus for combining symbols received from multi-paths in a CDMA communication system. In the symbol combining apparatus, a plurality of fingers despread signals received in multi-paths and extract symbol data, and a symbol combiner combines symbol data except for symbol data whose signs are inverted due to fading among the symbol data received from the fingers.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
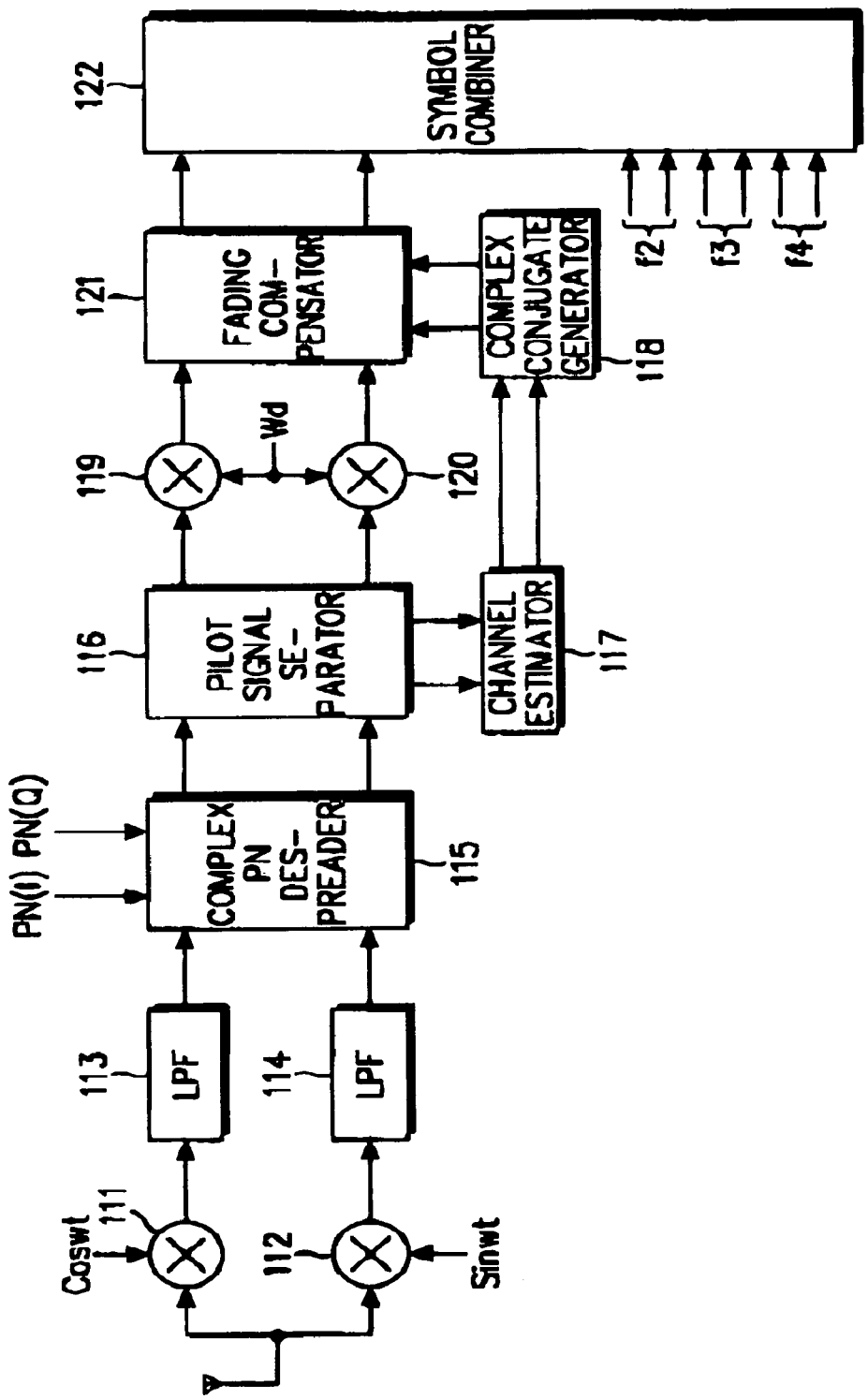
FIG. 1 is a block diagram of a mobile station receiver in a CDMA communication system according to a prior art; a FIG. 2 is a block diagram of a combiner shown in FIG. 1 according to an embodiment of the present invention, for selective combination of symbol data at a maximum ratio.

FIG. 1 is a block diagram of a mobile station receiver that selectively combines symbol data of each multi-path component. Symbol data is combined at a maximum ratio in a CDMA mobile communication system according to a prior art. Each of the fingers for demodulating multi-path components are the same and thus only one of them will be described. It is also to be noted that the following description is conducted on the assumption that four multi-path components are present.

Referring to FIG. 1, mixers 111 and 112 multiply a signal received through an antenna by a carrier cos(wt) and a carrier sin(wt), respectively. Carrier sin(wt) results from shifting the phase of the carrier cos(wt) by 90° for frequency downconversion.

The downconverted signals are $$S_2(t) = S_1(t) \times (\cos(wt) - j\sin(wt)) \quad \text{Eq. 2}$$

$$= (PW_0 + IW_d + jQW_d)(PN(I) +$$

$$jPN(Q))(f(I) + jf(Q))(\cos wt - j\sin wt)$$

$$= (PW_0 + IW_d + jQW_d)(PN(I) + jPN(Q))(f(I) + jf(Q))$$

Low pass filters (LPFs) 113 and 114 low-pass filter the output signals of the mixers 111 and 112. A complex PN despreader 115 complex-PN despreads the output signals of the LPFs 113 and 114 with PN codes received from a PN code generator (not shown).

The PN-despread signals are $$S_3(t) = S_2(t)(PN(I) + jPN(Q)) \quad \text{Eq. 3}$$

$$= (PW_0 + IW_0 + jQW_d)(PN(I) +$$

$$jPN(Q))(f(I) + jf(Q))(PN(I) - jPN(Q))$$

$$= (PW_0 + IW_d + jQW_d)(f(I) + jf(Q))$$

A pilot signal separator 116 separates an unmodulated pilot signal by multiplying the output signals of the complex PN despreader 115 by a pilot channel orthogonal code $W_0$. The pilot signal is $$S_4(t) = S_3(t) \times W_0 \quad \text{Eq. 4}$$

$$= (PW_0 + IW_d + jQW_d)(f(I) + jf(Q)) \times W_0$$

$$= P(f(I) + jf(Q))$$

(where $W_d \times W_0 = 0, \ W_0 \times W_0 = 1$)

Since the pilot signal is +1 in Eq. 4, the pilot signal shown in Eq. 4 is a fading component. That is, P is a pilot signal, in Eq. 4, $PW_0 \times W_0 = -1$; as a result in Eq. 4, the pilot signal is a fading component.

A channel estimator 117 accumulates the pilot signal $S_4(t)$ as expressed as Eq. 4 for a predetermined time and estimates a channel from a base station to the terminal. A complex conjugate generator 118 complex-conjugates the output of the channel estimator. That is, the complex conjugate generator 118 conjugates the accumulated signal of $S_4(t)$.

Mixers 119 and 120 multiply the output of the complex PN despreader 115 by a predetermined orthogonal code $W_d$, for orthogonal modulation. A fading component exists in the output signals of the mixers 119 and 120 given by $$S_5(t) = S_3(t) \times W_d \quad \text{Eq. 5}$$

$$= (PW_0 + IW_d + jQW_d)(f(I) + jf(Q)) \times W_d$$

$$= (I + jQ)(f(I) + jf(Q)$$

A fading compensator 121 compensates for the fading component by multiplying the outputs of the mixers 119 and 120 by the output of the complex conjugate generator 118. That is, the signal of Eq. 5 is multiplied by a signal having a gain resulting from accumulating the fading component of Eq. 4 for a predetermined time to thereby compensate for the fading. This can be expressed as $$S_6(t) = S_5(t) \times [\text{gain}](f(I) - jf(Q)) \quad \text{Eq. 6}$$

$$= (I + jQ)(f(I) + jf(Q)) \times [\text{gain}](f(I) - jf(Q))$$

$$= [\text{gain}](I + jQ)$$

The gain in Eq. 6 may be an inverted value due to deep fading. A symbol combiner 122 receives such a signal as shown in Eq. 6 from each finger and combines symbol data except for symbols whose signs are inverted due to deep fading. That is, the symbol combiner 122 excludes symbols including deep fading components from symbol combination to increase symbol energy.

Figure 2:
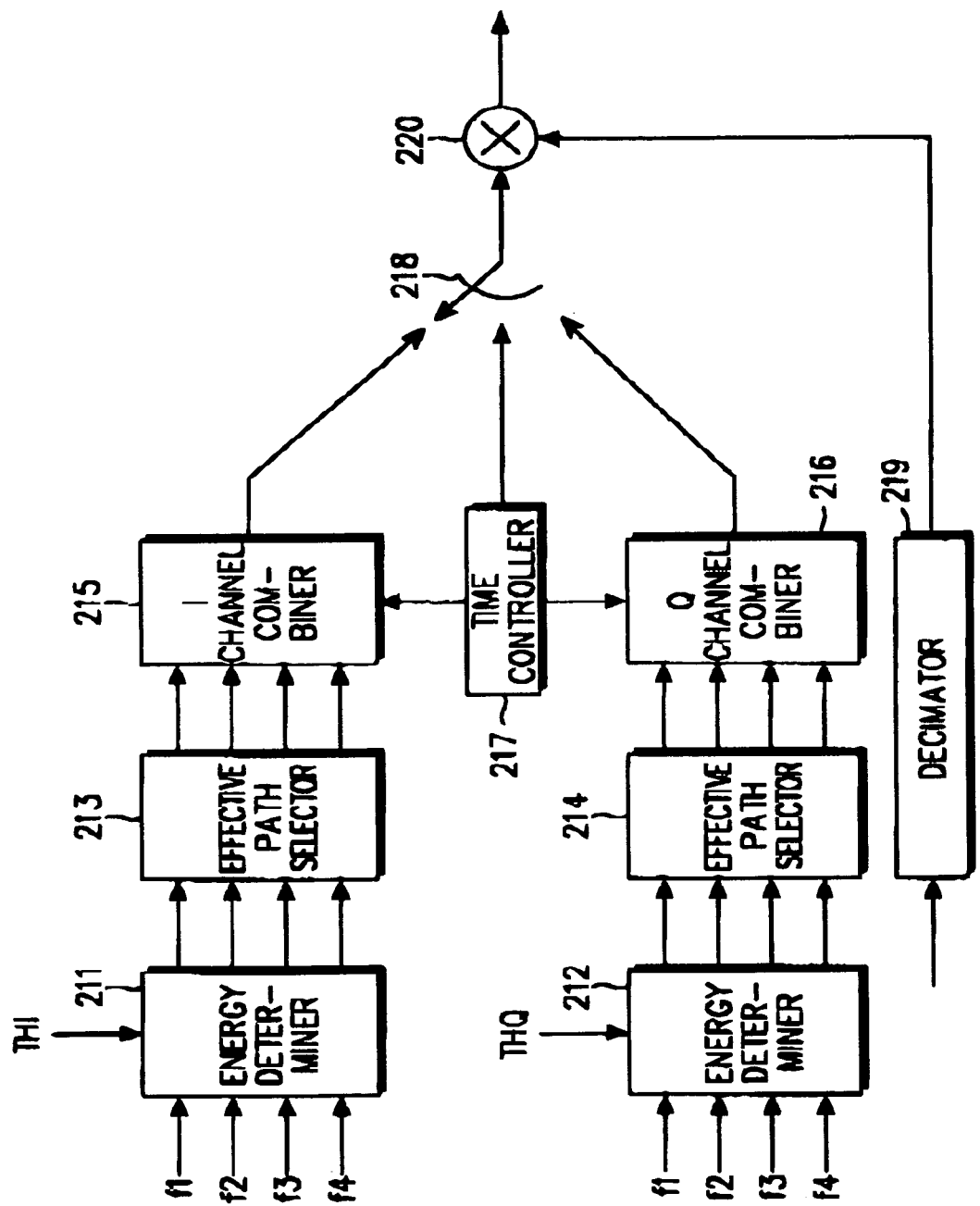

The symbol combiner 122 is shown in detail in FIG. 2. To achieve maximum symbol energy, the symbol combiner 122 is so configured that symbol data whose sign is inverted due to fading among symbol data including multi-path components is excluded from symbol combination although it has symbol energy is higher than a predetermined threshold.

Referring to FIG. 2, energy determiners 211 and 212 calculate the energies of the I and Q channel symbol data multiplied by a fading component and compare the energy with thresholds THI and THQ received from a higher layer controller (not shown). If the symbol data energies are equal or greater than the thresholds, the energy determiners 211 and 212 determine that the symbol data is locked and output the symbol data to effective path selectors 213 and 214. If the symbol data energies are smaller than the thresholds, the energy determiners 211 and 212 set the symbol data to 0s. The symbol data output from the energy determiner 211 is a 2's complement of n bits obtained by subjecting the symbol values ranging from +1 to −1 to ADC (Analog-to-Digital Conversion).

The effective path selectors 213 and 214 compare the MSBs (i.e., sign bits) of the symbol data (2's complements each having n bits) received from the respective energy determiners 211 and 212. The effective path selectors 213, 214 set symbol data with a sign different from the sign of a majority of symbol data to 0s, thus excluding the minority symbol data from symbol combination. The other symbol data having a sign corresponding to the majority of symbol data are output by the effective path selectors. Here, the symbol data with the sign different from the sign of the majority of symbol data is considered to have been inverted due to deep fading.

An I channel combiner 215 and a Q channel combiner 216 accumulate the symbol data received from the effective path selectors 213 and 214 in symbol units, combine the accumulated symbol data, and output the combined symbol data under the control of a time controller 217. A switch 218 multiplexes the outputs of the I and Q channel combiners 215 and 216 under the control of the time controller 217.

A decimator 219 decimates an input long code. A derandomizer 220 XOR-gates the outputs of the switch 218 and the decimator 219 to de-randomize a signal randomized by a long code at a transmitter. Here, a different long code is assigned to each subscriber as an identification. The de-randomized signal is fed to a decoder (not shown in FIG. 2) by de-randomizer 220.

In the thus-constituted receiver, upon receipt of a signal, the mixers 111 and 112 convert the input signal to baseband signals I and Q by frequency downconversion and the LPFs 113 and 114 low-pass filter the baseband signals. The complex PN despreader 115 PN despread the low pass filtered signals I and Q by multiplying them by PN(I) and PN(Q). The pilot separator 116 separates a pilot signal from the PN despread signals by multiplying the PN despread signals by a pilot channel orthogonal code. The channel estimator 117 accumulates the separated pilot signal for a predetermined time and the complex conjugate generator 118 obtains the complex conjugate of the accumulated signal as a channel compensation signal. Mixers 119 and 120 multiply the PN despread signals by an orthogonal code for a data channel, for channel demodulation. The fading compensator 121 multiplies the demodulated signal by the channel compensation signal received from the complex conjugate generator 118, for channel compensation. The output of the fading compensator 121 is channel-compensated symbol data. The energy determiners 211 and 212 calculate the symbol energies of the symbol data and compare the symbol energies with the thresholds THI and THQ to detect symbol data with energy locked. Energy determiner 211 determines the energy of the I channel symbol data and the energy determiner 212 the energy of the Q channel symbol data. The energy determiners 211 and 212 simply output symbol data with energy higher than the thresholds to the effective path selectors 213 and 214, and set symbol data with energy smaller than the thresholds to 0s and output the symbol data to the effective path selectors 213 and 214. Hence, symbol data with much energy lost due to fading is excluded from symbol combination. The energy determiners 211 and 212 calculate the symbol energies by integrating signals in symbol units and squaring them. If the energy of symbol data whose sign is inverted due to deep fading is higher than the thresholds, it is considered to be locked. This symbol data should be excluded from symbol combination to achieve maximum symbol energy. Therefore, the effective path selectors 213 and 214 determine the signs of symbols received from the energy determiners 211 and 212, detect symbol data with a sign different from the sign of a majority of symbol data, set the detected symbol data to 0s, and output the symbol data to channel combiners 215 and 216. Consequently, the channel combiners 215 and 216 combine the other symbols except for the symbols of which much energy has been lost due to fading, thereby outputting the symbol data with higher energy to the decoder.

Figure 3:
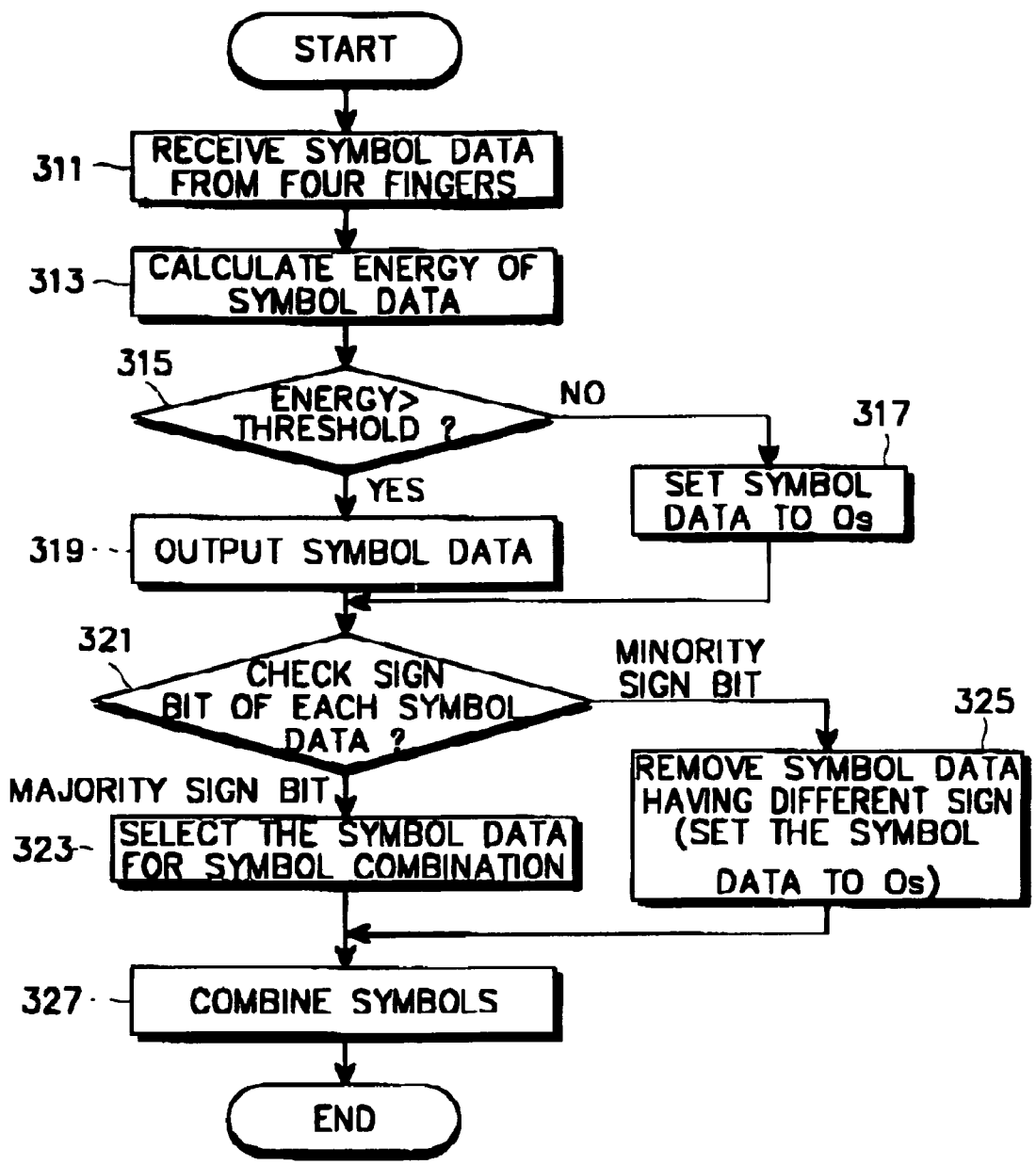
FIG. 3 is a flowchart illustrating a symbol combining procedure in the symbol combiner.

FIG. 3 is a flowchart illustrating a symbol combining procedure in the symbol combiner 122.

Referring to FIG. 3, the symbol combiner 122 receives symbol data from four fingers in step 311 and calculates the energy of each symbol data in step 313. In step 315, the symbol combiner 122 compares the calculated energy with a threshold. If the energy is greater than the threshold, the symbol combiner 122 selects the symbol data with the energy for symbol combination in step 319. If the energy is less than the threshold, the symbol combiner 122 sets the symbol data with the energy to 0 in step 317. In this manner, symbol data having a predetermined energy is extracted. The symbol combiner 122 separates the extracted symbol data into symbol data having a sign corresponding to a majority sign and symbol data having a sign different from the majority sign by checking the sign bit (MSB) of each symbol data with energy greater than the threshold in step 321. Here, the symbol data with the sign different from the majority sign is set to 0s, thus excluding the minority symbol data from symbol combination in step 325, and the majority symbol data is selected for symbol combination in step 323. The symbol combiner 122 accumulates the majority symbol data selected in step 323, thus combining the symbol data in step 327. That is, the symbol data with the majority sign is combined, excluding the symbol data with a sign which has been inverted due to deep fading from the symbol combination. Consequently, only the symbol data with higher energy is fed to the decoder.

As described above, the present invention excludes symbol data whose sign is inverted due to fading from symbol combination although its energy is locked, that is, its energy is higher than a threshold. Therefore, symbol energy that is passed is increased and an accurate decoding may be performed by subjecting symbol data with locked energy to symbol combination in conventional technology.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for combining symbols received from multi-paths in a CDMA communication system, comprising:
    a plurality of fingers each for despreading a signal received in one path and extracting symbol data; and
    a symbol combiner for receiving the symbol data from the plurality of fingers, removing symbol data, whose sign is inverted due to fading, from the symbol data received from the plurality of fingers, and combining the remaining symbol data, said symbol combiner comprising:
    an energy determiner for calculating the energy of symbol data received from the fingers and outputting symbol data with energy higher than a threshold;
    an effective path selector for outputting only symbol data with a sign corresponding to the majority sign among the symbol data received from the energy determiner; and
    a channel combiner for accumulating the symbol data received from the effective path selector and outputting the accumulated symbol data.

2. The apparatus of claim 1, wherein the symbol data is a 2's complement of n bits.

3. An apparatus for combining symbols received from multi-paths in a CDMA communication system, comprising:
    a plurality of fingers each having at least a fading component generator for generating a fading component by extracting a pilot signal from a signal received from a path, a channel demodulator for extracting symbol data by despreading the input signal, and a fading compensator for multiplying the symbol data by the fading component for channel compensation;
    an energy determiner for calculating the energy of symbol data received from the fingers and outputting symbol data with energy higher than a threshold;
    an effective path selector for outputting only symbol data with a sign corresponding to the majority sign among the symbol data received from the energy determiner; and
    a channel combiner for accumulating the symbol data received from the effective path selector and outputting the accumulated symbol data.

4. The apparatus of claim 3, wherein the symbol data is a 2's complement of n bits.

5. An apparatus for combining symbols received from multi-paths in a CDMA communication system, comprising:
    a first energy determiner and a second energy determiner for calculating the energy of corresponding I and Q channel symbol data and outputting symbol data with energy higher than a threshold;

a first effective path selector and a second effective path selector for outputting only symbol data with a sign corresponding to the majority sign among the symbol data received from the first and second energy determiners;

an I channel combiner and a Q channel combiner for accumulating the symbol data received from the first and second effective path selectors, respectively, and outputting the accumulated symbol data;

a switch for multiplexing the symbol data received from the I and Q channel combiners; and a de-randomizer for XOR-gating the symbol data received from the switch and a predetermined long code and outputting the de-randomized symbol data.

6. A method for combining symbols received via multiple paths in a CDMA communication system, comprising the steps of:

receiving symbol data from a plurality of fingers;

calculating the energy of each received symbol data and comparing the energy with a threshold;

extracting symbol data with energy higher than the threshold as symbol data to be combined;

selecting symbol data having a sign corresponding to the majority sign by checking the signs of the extracted symbol data; and combining the selected symbol data in symbol units through accumulation.

7. A method for combining symbols received via multiple paths in a CDMA communication system, comprising the steps of:

receiving symbol data from a plurality of fingers by an energy determiner;

calculating the energy of each received symbol data and comparing the energy with a threshold by the energy determiner;

outputting symbol data with energy higher than the threshold to an effective path selector and setting symbol data with energy less than the threshold to 0s by the energy determiner;

checking the signs of the symbol data received from the energy determiner by the effective path selector;

setting symbol data with a sign different from the majority sign of the other symbol data to 0s and outputting the other majority data to a channel combiner by the effective path selector; and combining the symbol data received from the effective path selector in symbol units through accumulation by the channel combiner.

* * * * *